United States Patent [19]

Douglas

[11] E Patent Number: Re. 33,386

[45] Reissued Date of Patent: Oct. 16, 1990

[54] METHOD AND APPARATUS FOR SAMPLING A PLASMA INTO A VACUUM CHAMBER

[76] Inventor: Donald J. Douglas, 157 Wychwood Ave., Apt. 3, Toronto, Ontario M6C 2T1, Canada

[21] Appl. No.: 84,670

[22] Filed: Aug. 7, 1987

Related U.S. Patent Documents

Reissue of:

[64] Patent No.: 4,501,965
Issued: Feb. 26, 1985
Appl. No.: 458,009
Filed: Jan. 14, 1983

[51] Int. Cl.[5] ..... H01J 49/04; H01J 49/26

[52] U.S. Cl. ..... 250/288; 250/281; 250/282; 250/423 R; 315/111.81; 313/363.1

[58] Field of Search ..... 250/288, 281, 282, 423 R; 315/111.81; 313/363.1, 359.1

[56] References Cited

U.S. PATENT DOCUMENTS

| | | | |
|---|---|---|---|
| 2,831,134 | 4/1958 | Reifenschweiler | 313/363.1 |
| 3,085,058 | 4/1963 | Buchsbaum | 250/282 |
| 3,143,680 | 8/1964 | Klein et al. | 250/281 |
| 3,944,826 | 3/1976 | Gray | 250/288 |

FOREIGN PATENT DOCUMENTS 1471211 3/1967 France .

OTHER PUBLICATIONS

Goodwin, The Review of Scientific Instruments, vol. 24, No. 8, Aug. 1953, pp. 635–638.

*Primary Examiner*—Jack I. Berman
*Attorney, Agent, or Firm*—Laff, Whitesel, Conte & Saret

[57] ABSTRACT

A plasma is generated within an induction coil and the plasma is sampled through an orifice into a vacuum chamber for mass analysis of trace ions in the plasma. Arcing at the orifice is prevented by grounding the induction coil at or near its center, thus eliminating ultraviolet noise and reducing average ion energies and ion energy spread, as well as preventing destruction of the orifice. The elimination of arcing at the orifice allows the use of a sharp edge orifice structure to prevent formation of a cool boundary layer over the orifice and also permits direct sampling of the plasma. The direct sampling and the lack of cooling prevent recombination and reaction of the ions with oxygen and improve the response to elements of high ionization potential, increasing the desired ion signal and greatly reducing the presence of oxides which would otherwise complicate the spectrum.

25 Claims, 4 Drawing Sheets

METHOD AND APPARATUS FOR SAMPLING A PLASMA INTO A VACUUM CHAMBER

Matter enclosed in heavy brackets [ ] appears in the original patent but forms no part of this reissue specification; matter printed in italics indicates the additions made by reissue.

This invention relates to method and apparatus for sampling an inductively generated plasma through an orifice into a vacuum chamber, and to method and apparatus for mass analysis using such sampling. The invention will be described with reference to mass analysis.

Mass analyzers for detecting and analyzing trace substances require that ions of the substance to [by] *be* analyzed be introduced into a vacuum chamber containing the mass analyzer. It is often desired to perform elemental analysis, i.e. to detect and measure the relative quantities of individual elements in the trace substance. In theory the trace substance can be reduced to its individual elements by introducing the trace substance into a high temperature plasma, which produces predominantly singly charged ions of the elements. The use of a high temperature plasma as an ion source has a number of well recognized advantages, including the fact that it produces mostly singly charged ions; interference by other elements to the element to be detected is reduced, isotopic information is obtained, and the ionization efficiency of the source is very high so that numerous ions are produced for analysis.

However a major difficulty in the past is associated with the fact that the plasma is normally operated at atmospheric pressure; the mass analyzer is located in a vacuum chamber, and therefore a sample of the plasma must be extracted from the plasma and directed through a small orifice into the vacuum chamber. The plasma is at very high temperature (typically 4,000 degrees K. to 10,000 degrees K.) and is a relatively good electrical conductor. It is found that when a portion of the hot plasma is directed through a small orifice, an arc-like breakdown occurs between the plasma and the edge of the orifice, destroying the orifice and producing ultraviolet noise which enters the mass analyzer and interferes with the detection of ions. The effect has been called the "pinch" effect by other workers and it greatly limits the utility of the plasma ion source approach.

Attempts have been made to solve the pinch effect problem by boundary layer sampling. In this solution the orifice through which the plasma is sampled is located in a flat surface of a plate which is kept relatively cool. As the plasma plays against the cool plate, it produces a cool boundary layer immediately next to the plate. Ions are extracted through the boundary layer rather than from the plasma directly, and since the boundary layer is cool (and therefore is a relatively good electrical insulator), arcing effects are reduced or eliminated. However, a major disadvantage to this approach is that the ions present in the plasma tend to recombine and react in the cool boundary layer and to form oxides. The recombination and reaction reduce the number of ions available for analysis, and the oxide formation greatly complicates the analysis. Therefore the use of a cooled boundary layer for sampling has serious commercial disadvantages.

Alan L. Gray, at a conference in January, 1982 entitled "1982 Winter Conference on Plasma Spectrochemistry" at Orlando, Fla., U.S.A. disclosed the use of a relatively large orifice (which removed the cooled boundary layer), together with staged vacuum chambers, which is said to eliminate the prior difficulties. However, the results disclosed appear to be applicable only in limited special circumstances. The applicant's tests using a similar sampling arrangement and staged vacuum pumping have not reproduced these results.

The invention provides method and apparatus for sampling a plasma through an orifice into a vacuum chamber in which the problem of arcing and generation of ultraviolet noise at the orifice is greatly reduced, and in which the problem of recombination and reaction of ions adjacent the orifice is also reduced. In one aspect the invention provides apparatus for sampling a plasma into a vacuum chamber comprising:

(a) means for generating a plasma, including an electrical induction coil having first and second terminals and at least one turn between said first and second terminals, said turn defining a space within said coil for generation of said plasma, (b) a vacuum chamber including an orifice plate defining a wall of said vacuum chamber, (c) said orifice plate having an orifice therein located adjacent said space for sampling a portion of said plasma through said orifice into said vacuum chamber, (d) *said coil constituting the sole electrical power means for generating said plasma,*

(*e*) and circuit means connected to said coil between said terminals to reduce the peak to peak voltage swing in said plasma, *thus to reduce the likelihood of electrical arcing from said plasma.*

In this description and in the appended claims, the term "vacuum chamber" is intended to mean a chamber in which the pressure is substantially less than atmospheric.

In another aspect the invention provides a method of sampling a plasma into a vacuum chamber comprising:

(a) applying a high frequency electrical current to a coil to generate a plasma within said coil, (*b*) *said current in said coil being the sole electrical power means for generating said plasma,*

[(b)] (*c*) reducing the peak to peak voltage variations in said plasma by limiting the voltage [variation] *variations* in said coil at a position between the ends thereof, *thus to reduce the likelihood of electrical arcing from said plasma,* and [(c)] (*d*) directing a portion of said plasma through an orifice into said vacuum chamber.

Further objects and advantages of the invention will appear from the following description, taken together with the accompanying drawings in which.

Figure 1:
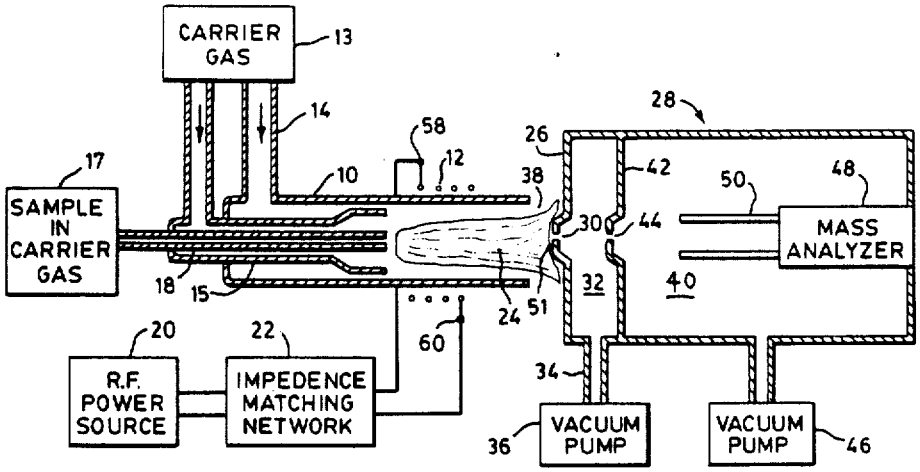
FIG 1 (PRIOR ART)
FIG. 1 is a diagrammatic view (not to scale) showing prior art apparatus for mass analysis and with which the invention may be used.

Reference is first made to FIG. 1, which shows a plasma tube 10 around which is wrapped an electrical induction coil 12. A carrier gas (e.g. argon) used to form the plasma is supplied from a source 13 and is directed via conduit 14 into the plasma tube 10. A further stream of the carrier gas is directed from the source 13 through an inner tube 15 within the plasma tube 10 and exists via a flared end 16 just upstream of the coil 12. A sample gas containing the trace substance to be analyzed is supplied in argon from source 17 and is fed into the plasma tube 10 through a thin tube 18 within and coaxial with the tube 15. Thus the sample gas is released into the centre of the plasma to be formed.

The coil 12 normally has only a small number of turns (four turns in the embodiment tested) and is supplied with electrical power from an RF power source 20 fed through an impedance matching network 22. The power fed to the coil 12 varies depending on the nature of the plasma required and may range between 200 and 10,000 watts. The energy supplied is at high frequency, typically 27 MHz. The voltage across the coil 12 is believed to be up to several thousand volts, depending on operating conditions. The plasma generated by this arrangement is indicated at 24 and is at atmospheric pressure The plasma tube 10 is located adjacent a first orifice plate 26 which defines one end wall of a vacuum chamber 28. Plate 26 is water cooled, by means not shown. Gases from the plasma 24 are sampled through an orifice 30 in the plate 26 into a first vacuum chamber section 32 which is evacuated through duct 34 by a pump 36. The remaining gases from the plasma exit through the space 38 between the plasma tube 10 and the plate 26.

The first vacuum chamber section 32 is separated from a second vacuum chamber section 40 by a second orifice plate 42 containing a second orifice 44. The second vacuum chamber section 40 is evacuated by a vacuum pump 46. Located in the second vacuum chamber section 40 is a mass analyzer indicated at 48. The mass analyzer may be a quadrupole mass spectrometer having rods 50. For purposes of clarity the plasma tube 10 in FIG. 1 has been shown greatly enlarged with respect to the vacuum chamber.

In use, the first vacuum chamber section 32 is typically maintained at a pressure of about 1 torr, and a second vacuum chamber section 40 is typically maintained at a pressure of $10^{-5}$ torr. A portion of the plasma 24 is sampled through the first orifice 30 into the first vacuum chamber section 32. Ions in the plasma are drawn through the first orifice 30 into the first vacuum chamber section 32 by the gas flow through the first orifice 30. The ions are then drawn through the second orifice 44 again by the gas flow through the second orifice 44.

As discussed, it is found that when the system shown in FIG. 1 is used, the plasma 24 tends to arc through or to the first orifice 30 and sometimes may even arc through or from the first orifice 30 to the second orifice 44. The arcing destroys the orifices and also generates ultraviolet noise which interferes with the analysis of any ions which may enter the mass analyzer 48. In addition, ions characteristic of the orifice material may appear in the mass spectrum and interfere with the analysis.

The undesired arcing is aggravated when (as in the present case) there is a vacuum chamber 28 on the side of the first orifice plate 26 remote from the plasma 24. The increased arcing occurs because the increased flow of gas through the orifice 30 caused by the vacuum tends to remove the cooled layer of gas which would otherwise tend to collect against the outside of the orifice plate 26 and which would provide some electrical insulation against arcing. If the first orifice 30 is made sufficiently small, then the cooled layer 51 of gas overlying the first orifice plate 26 at the first orifice will tend to exist even with vacuum pumping, but with a very small orifice 30, only a small sample of the plasma 24 can be drawn into the first vacuum chamber section 32, reducing the ion signal. In addition if the first orifice 30 is made very small it more readily tends to melt or clog. If the first orifice 30 is made larger, then the cooled layer 51 of gas overlying the orifice plate 26 becomes thin or vanishes and arcing occurs as indicated.

The applicant has discovered after extensive research that the arcing appears to be caused by large peak to peak voltage swings in the plasma itself. Although it is difficult to measure voltages in the plasma generated by a high frequency electrical field (because the probe used for measurement tends to be melted by the plasma and because of undesirable RF pick-up produced by the generating field), a determination has been made that the peak to peak voltage swing in the plasma with the arrangement shown is very large (e.g. of the order of up to 1,000 volts). Having made this determination, the next problem was to determine how this voltage swing was being produced.

Figure 2:
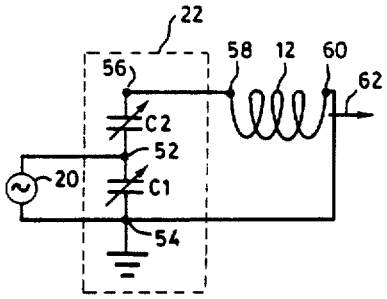
FIG 2 (PRIOR ART)
FIG. 2 is a schematic drawing of an impedance matching circuit and induction coil used with the apparatus of FIG. 1.

Tests were then conducted to determine the origin of the large voltage swings in the plasma, and these tests will be explained with reference to FIG. 2. FIG. 2 shows a circuit for the typical tuning and impedance matching device 22 used to supply RF power to the plasma. The impedance matching device 22 consists of two variable capacitors C1, C2 connected in series at terminal 52 with the power source 20 connected across capacitor C1 at terminals 52, 54. A terminal 56 at the free end of capacitor C2 is connected to terminal 58 at the upstream end of the coil 12 while the other end 60 of coil 12 is connected to terminal 54. The direction of gas flow through the coil 12 is indicated by arrow 62. The arrangement as shown in FIG. 2 produced the very large voltage swings discovered in the plasma 24.

The first test was to connect a ground to terminal 60 immediately at the downstream end of the coil, on the theory that the long lead used from 60 to 54 had inductance which was generating a voltage swing at terminal 60 and that this was contributing to the voltage swing in the plasma. This additional ground reduced the voltage swing to less than half of that originally detected, but a large voltage swing in the plasma remained and still produced arcing.

Figure 3:
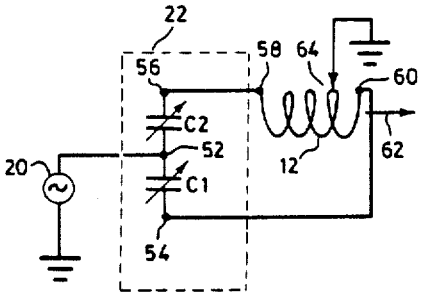
FIG. 3 is a schematic drawing similar to that of FIG. 2 but showing an impedance matching circuit and induction coil modified according to the invention.

Next, the impedance matching circuit was modified as shown in FIG. 3, so that the former connection between ground and terminal 54 was removed. Instead the coil 12 was tapped at 64 and the tap 64 was grounded. The tap 64 was then moved back and forth along the coil and the peak to peak voltage swings in the plasma 24 were measured for different positions of the tap 64 along the coil 12. The measurements are plotted to form curve 66 in FIG. 4, where the absolute value of the plasma peak to peak voltage swing is shown on the vertical axis and the position of the tap 64 is shown on the horizontal axis. On the horizontal axis the number "0" indicates the terminal 60 at the downstream or exit end of the coil 12, and the number "4" denotes the terminal 58 at the entrance or upstream end of the coil 12. The numbers "1", "2" and "3" indicate turns 1, 2 and 3 respectively of the coil 12. The center of the coil is located at "2" in FIG. 4.

Figure 4:
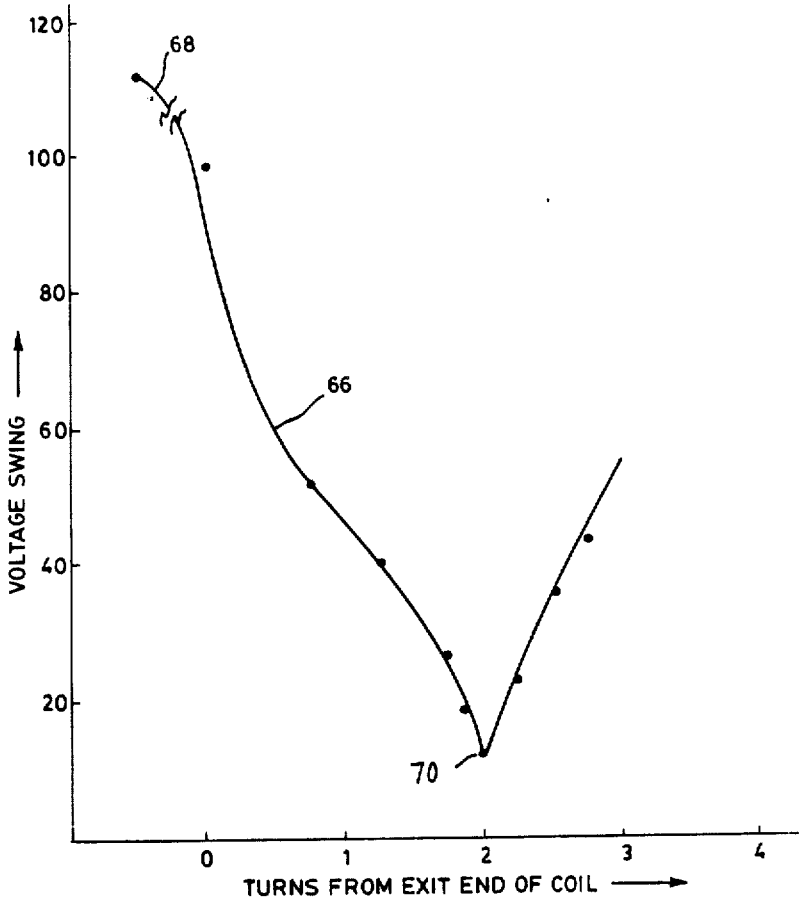
FIG. 4 is a graph showing the absolute value of the plasma RF voltage plotted against the position of the tap taken axially along the coil.

In the FIG. 4 curve it will be seen that at point 68, the tap 64 is located downstream of terminal 60, between terminals 54 and 60. It will be seen in FIG. 4 that the absolute value of the peak to peak voltage swing 66 in the plasma decreases as the tap 64 is moved from the downstream end "0" of the coil toward the center "2" of the coil, reaching a minimum at the two turn location. The voltage swing then increases as the tap 64 is moved toward the upstream end "4" of the coil. The voltage at the null point 70 is indicated as being about 13 volts, but it is difficult to measure the voltage accurately to within less than five volts absolute value because of RF pick-up difficulties. In addition, a small voltage (of the order of 10 volts) is generated in the plasma by heating currents flowing through the plasma and this voltage is apparently not eliminated by moving the tap 64. It will be noted that the voltage measurements shown were of the absolute value of the voltage swing in the plasma, because it is difficult to measure the polarity of such voltage. However, in theory it is expected that the voltage swings being measured would reverse in phase as the tap 64 is moved past the center "2" of coil 12.

When the tap 64 was located near the center of the coil (e.g. within about one-quarter turn from the center of the coil for a four turn coil), it was found that arcing at the orifices 30, 44 was eliminated and in addition both the energy and the energy spread of the ions travelling through the orifices were much reduced. Specifically, reference is next made to FIG. 5, which shows on the vertical axis the number of ions travelling through the orifices 30, 44 into the mass analyzer 48, and on the horizontal axis the energies of such ions in electron volts. Curve 72 shown in solid lines and with solid measurement points was produced when the tap 64 was located one-quarter turn from the end "0" of the coil, and curve 74 shown in dotted lines and with outline measurement points resulted when the tap 64 was located at one and three-quarter turns from the end "0" of the coil (i.e. nearly at the center of the coil). For curve 72 considerable arcing occurred through the orifice and there was considerable scatter of the observed points, as shown, so a smoothed line was drawn through the points. It will be seen that the energy spread of the ions at 10% height was about 44 electron volts and at 50% height was about 17 electron volts. In addition the maximum energy of a substantial number of the ions exceeded 30 electron volts. The high energies and energy spread of the ions greatly reduce the ability of the quadrupole mass analyzer 48 to analyze the trace substance being examined. In contrast, it will be seen from curve 74 that the energy spread of the ions passing through the orifices was much less, namely about 11 electron volts at 10% height and about 5 electron volts at half height. The improvement was dramatic and leads to a corresponding improvement in detection and analysis, as will be explained.

Figure 5:
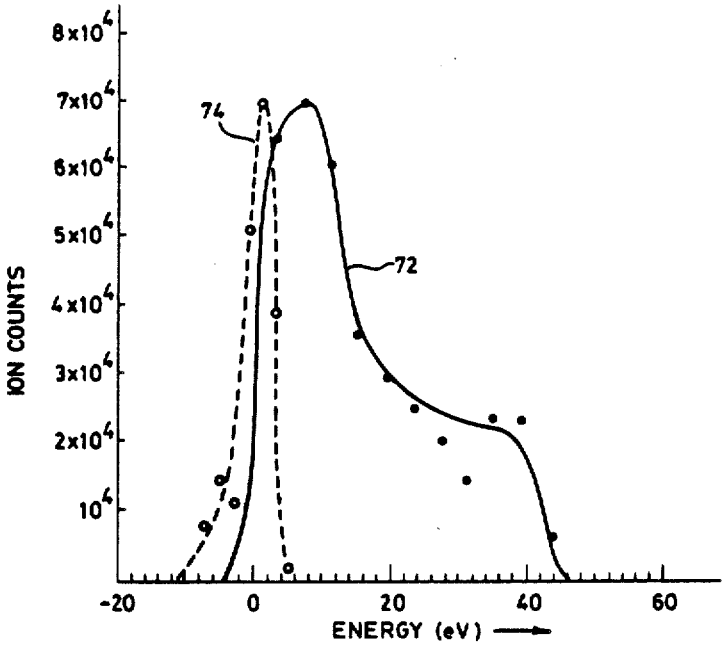
FIG. 5 is a graph showing the energy and energy spread of ions transmitted into the mass spectrometer from the plasma for two positions of the ground tap of FIG. 3.
Figure 6:
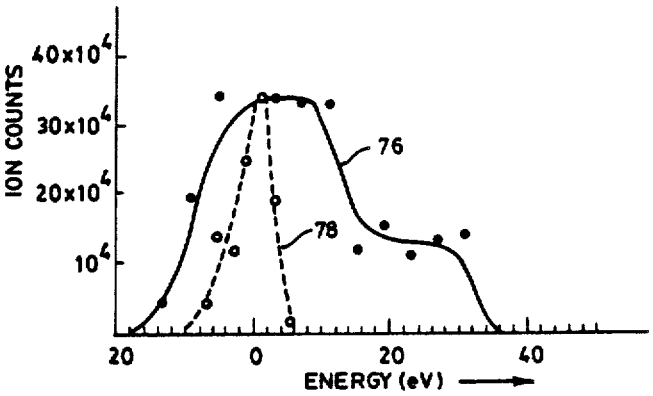
FIG. 6 is a further graph showing the energy and energy spread of ions transmitted from the plasma into the mass analyzer for two positions of the ground tap of FIG. 3.

FIG. 6 is similar to FIG. 5 but shows curve 76 produced when the tap 64 was located at three-quarters of a turn from the end "0" of the coil and curve 78 produced when the tap 64 was again located one and three-quarter turns from the end "0" of the coil. The results are similar to those described previously, i.e. for the tap 64 near the center of the coil, both the energy spread of the ions and the average energy of the ions are much reduced.

Figure 7:
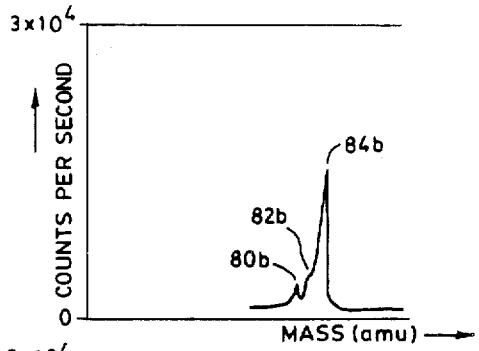
FIG. 7 is a mass spectrum for strontium taken with the ground tap of FIG. 3 at a first position.
Figure 8:
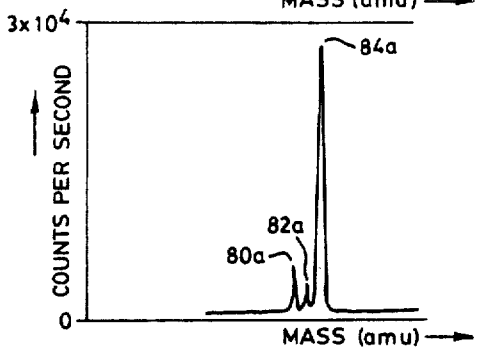
FIG. 8 is a mass spectrum for strontium taken with the ground tap of FIG. 3 at a second position.

The effect of the reduced ion energy and ion energy spread will be explained with reference to FIGS. 7 and 8, which are mass spectra for a ten parts per million solution of the element strontium. The number of ion counts detected is shown on the vertical axis and the mass in atomic mass units (amu) is shown on the horizontal axis. FIG. 7 shows the mass spectrum obtained with the tap 64 located three-quarters of a turn from the downstream end "0" of the coil (as shown for curve 76 in FIG. 6). FIG. 8 shows the mass spectrum obtained when the tap 64 is located one and three-quarter turns from the downstream end "0" of the coil (as shown for curve 78 in FIG. 6). In both cases the full scale value on the vertical axis was $3\times10^4$ counts per second. It will be seen that in FIG. 8 the three strontium peaks indicated at 80a, 82a and 84a (corresponding to 86, 87 and 88 atomic mass units) have been clearly resolved whereas in FIG. 7 the same peaks 80b, 82b, 84b have been poorly resolved and the maximum level of peak 84b is lower than that of peak 84a. As expected, the reduced ion energies and energy spread have produced substantially greater resolution and increased ion signal for analysis.

Figure 9:
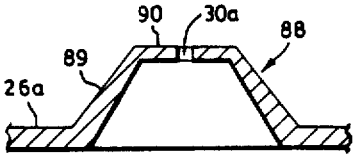
FIG. 9 is a cross sectional view of an orifice plate having a blunt orifice structure.

A further advantage of the invention is that because there is no need to sample from a cool boundary layer used to protect the orifice, the orifice sampling plate may be arranged to reduce or eliminate any such cool boundary layer. This aspect of the invention is explained with reference to FIGS. 9 and 10. FIG. 9 shows a first orifice plate 26a having a blunt conical orifice structure 88 defined by a conical side wall 89, a flat (i.e. blunt) top wall 90, and an orifice 30a in the top wall 90. In use the blunt top wall 90 tends to produce a cool boundary layer (as shown at 51 in FIG. 1) of gas over the orifice 30a, which boundary layer insulates the orifice from the plasma in order to reduce arcing. Unfortunately since the plasma is at atmospheric pressure, rapid recombination and reaction of the ions with oxygen occurs at the cool boundary layer (the recombination rate varies with the third power of the pressure and the reaction rate varies with the second power of the pressure). This results not only in loss of ion signal available for analysis but also in the entrance of oxides into the mass analyzer, complicating the analysis.

Figure 10:
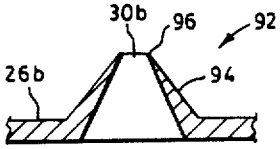
FIG. 10 is a cross sectional view of an orifice plate having a sharp edge orifice structure.

FIG. 10 shows an alternative first orifice plate 26b having a sharp edge orifice structure 92 defined by a conical side wall 94 terminating at a [sharpe] *sharp* edge 96. The edge 96 defines the first orifice 30b. The FIG. 10 orifice structure results in the reduction or elimination of a cool boundary layer over orifice 30b (even though the plate 26b itself may be cooled), because there is not flat surface adjacent the orifice over which a cooled boundary layer can readily form. Thus the plasma being sampled through orifice 30b is not greatly cooled until after it enters vacuum chamber section 32. Since the pressure in vacuum chamber section 32 is only about one torr (as compared with 760 torr on the outside of orifice plate 26b), the recombination rate is reduced by about $760^3$ and the reaction rate by about $760^2$.

Figure 11:
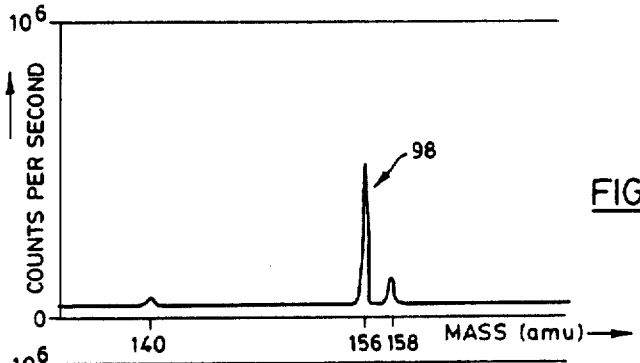
FIG. 11 is a mass spectrum for cerium taken using the blunt orifice structure of FIG. 9.
Figure 12:
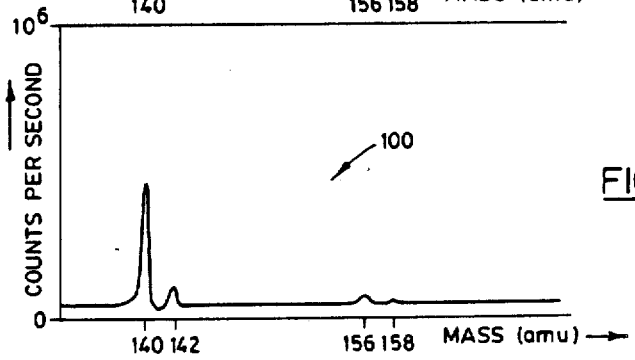
FIG. 12 is a mass spectrum for cerium taken using the sharp edge orifice structure of FIG. 10.

The improvement produced by the use of the sharp edge orifice structure 92 (which can be used without arcing because of the tap 64 located near the center of the coil) is shown in FIGS. 11 and 12, which show mass spectra obtained for a ten parts per million solution of cerium. FIG. 11 shows the mass spectrum 98 obtained using the blunt orifice structure 88 of FIG. 9 and FIG. 12 shows the mass spectrum 100 obtained using the sharp edge orifice structure 92 of FIG. 10. Here full scale on the vertical axis was $10^6$ counts per second. It will be seen that in FIG. 11 the peak at 140 amu (which is the mass of cerium) is extremely small, while a large peak is located at mass 156 (cerium oxide) and a smaller peak (but still larger than the cerium peak) is located at mass 158 (the oxide of an isotope of cerium).

In contrast FIG. 12 shows a large peak at mass 140 (cerium) and a substantial peak at mass 142 (an isotope of cerium). Only a small peak now appears at mass 156 (cerium oxide), and virtually no peak appears at mass 158. The enormous increase in ion signal for the elemental ions and the corresponding reduction in the quantity of oxides produced greatly improve the ability to decipher the complex spectrum obtained when many elements are mixed together. (For FIG. 12 the resolution was deliberately reduced to ensure that there would be no mass discrimation against the higher mass oxides.)

A further advantage of the invention is that it improves the response to elements of high ionization potential. Formerly it was common practice to place an extra water cooled orifice plate between the first orifice 30 and the plasma 24. Thus a reduced scale, rapidly cooling plasma was sampled through the first orifice 30. Air mixed rapidly into this plasma and reacted thereon to produce nitric oxide (NO). The ionization potential of NO is 9.25 electron volts. Metal ions of higher ionization potential in the plasma tended to undergo change transfer reactions with the NO to produce $NO^+$ and neutral metal atoms. The metal atoms, having become neutral, could not be detected by the mass analyzer.

Figure 13:
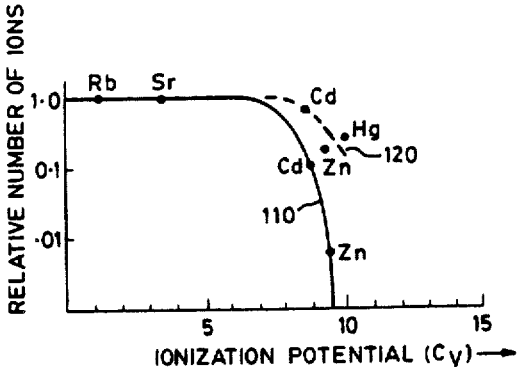
FIG. 13 is a graph showing relative numbers of ions versus their ionization potential.

When the invention is used, sampling may be carried out much closer to the hot plasma (since arcing has been essentially eliminated) and air has less opportunity to mix into the plasma sample. Therefore nitrogen oxides are less likely to form. Thus ions of higher ionization potential do not lose their charge and hence can be seen by the mass analyzer. This is illustrated in FIG. 13, which shows relative numbers of ions on the vertical axis on a log scale, and the ionization potential of the elements in electron volts (various elements are marked on the graph) on the horizontal axis. The curve for the prior art method without the use of the invention is shown at 110 and the curve with the invention used is shown at 120. For higher ionization potential elements such as zinc, the improvement in ion signal can be by a factor of fifty. For mercury the improvement is even greater.

It will be realized that although the tap 64 is shown as grounded, it may instead be clamped to a different fixed potential, depending on the circuit arrangements provided. Alternatively a variable voltage may be applied to tap 64, so long as the effect is to reduce sufficiently the peak to peak voltage swing in the plasma.

Figure 14:
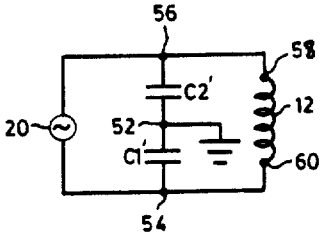
FIG. 14 shows an alternative electrical circuit for use with the invention.

As a further alternative the tap 64 may be eliminated entirely and a circuit such as that shown in FIG. 14 may be used. In the FIG. 14 circuit the power supply 20 is connected to terminals 54, 56, i.e. across the two capacitors now indicated as C1', C2', and the terminal 52 between capacitors C1', C2' is grounded. Terminals 56, 58 are connected together as are terminals 54, 60, as before. Provided that the circuit is carefully balanced so that the capacitance of C1' and its leads is equal to the capacitance of C2' and its leads, the circuit will be symmetrical and will be equivalent electrically to having a ground centre tap in coil 12. Thus the RF voltage at the centre of coil 12 will remain at or near zero as before.

Impedance matching, if needed for the FIG. 14 circuit, may be effected by a transformer or other means located between the RF power source 20 and the location in the circuit now shown for the source 20.

Although a four turn coil has been shown, more or fewer turns may be used as appropriate for the application in question.

I claim:

1. Apparatus for sampling a plasma into a vacuum chamber comprising:

(a) means for generating a plasma, including an electrical induction coil having first and second terminals and at least one turn between said first and second terminals, said turn defining a space within said coil for generation of said plasma, *and means for supplying an alternating electrical current to said coil to excite said plasma,*

(b) a vacuum chamber including an orifice plate defining a wall of said vacuum chamber, (c) said orifice plate having an orifice therein located adjacent said space for sampling a portion of said plasma through said orifice into said vacuum chamber,

*(d) the electrical current in said coil constituting the sole electrical power means for generating said plasma,*

[(d)] *(e)* and circuit means connected to said coil between said terminals to reduce the peak to peak voltage swing in said plasma*thus to reduce the likelihood of electrical arcing from said plasma.*

2. Apparatus according to claim 1 wherein said coil includes a plurality of turns.

3. Apparatus according to claim 2 wherein said circuit means includes means for holding the potential at a point in said coil between said terminals at a substantially constant value.

4. Apparatus according to claim 3 wherein said value is ground.

5. Apparatus according to claim 3 wherein said point is located at or near the centre of said coil.

6. Apparatus according to claim 4 wherein said point is located at or near the centre of said coil.

7. Apparatus according to claim 2 wherein said circuit means includes a tap connected to said coil between said terminals thereof, said tap being located at or near the centre of said coil.

8. Apparatus according to claim 7 wherein said tap is clamped to a substantially fixed potential.

9. Apparatus according to claim 8 wherein said potential is ground.

10. Apparatus according to claim 3 and including mass analyzer means located within said vacuum chamber for analyzing ions sampled into said vacuum chamber from said plasma.

11. Apparatus according to claim 9 and including mass analyzer means located within said vacuum chamber for analyzing ions sampled into said vacuum chamber from said plasma.

12. Apparatus according to claim 3 wherein said orifice plate includes a conical wall extending outwardly from said plate towards said space, said conical wall having a sharp outer edge which defines said orifice.

13. Apparatus according to claim 9 wherein said orifice plate includes a conical wall extending outwardly from said plate towards said space, said conical wall having a sharp outer edge which defines said orifice.

14. Apparatus according to claim 3 wherein said orifice plate includes a conical wall extending outwardly from said plate towards said space, said conical wall having a sharp outer edge which defines said orifice, said apparatus further including mass analyzer means located within said vacuum chamber for analyzing ions sampled into said vacuum chamber from said plasma.

15. Apparatus according to claim 9 wherein said orifice plate includes a conical wall extending outwardly from said plate towards said space, said conical wall having a sharp outer edge which defines said orifice, said apparatus further including mass analyzer means located within said vacuum chamber for analyzing ions sampled into said vacuum chamber from said plasma.

16. A method of sampling a plasma into a vacuum chamber comprising:

(a) applying a high frequency electrical current to a coil to generate a plasma within said coil, (*b*) *said current in said coil being the sole electrical power means for generating said plasma,*

[(b)] (*c*) reducing the peak to peak voltage variations [is] *in* said plasma by limiting the voltage variations in said coil at a position between the ends thereof, *thus to reduce the likelihood of electrical arcing from said plasma,* and

[(c)] (*d*) directing a portion of said plasma through an orifice into said vacuum chamber.

17. A method according to claim 16 wherein said step (b) comprises holding the potential in said coil at a position between the ends thereof at a substantially constant value.

18. A method according to claim 17 wherein said value is substantially ground.

19. A method according to claim 17 wherein said position is at or near the center of said coil.

20. A method according to claim 17 wherein said position is within one-quarter turn from the center of said coil.

21. A method according to claim 17 wherein said position is at or near the center of said coil and including the step of analyzing ions in said portion of said plasma.

22. A method according to claim 17 wherein said position is at or near the center of said coil and including the step of analyzing with a mass analyzer ions in said portion of said plasma.

23. A method according to claim 17 wherein said position is at or near the center of said coil and including the step of analyzing ions in said portion of said plasma, said method further including the step of preventing substantial cooling of said plasma over said orifice to reduce recombination and reaction of said ions in said plasma with oxygen.

*24. Apparatus according to claim 1 and including means for maintaining said plasma at substantially atmospheric pressure.*

*25. A method according to claim 16 wherein said plasma is operated at substantially atmospheric pressure.*

* * * * *